INVENTOR.
THOMAS C. WERGE
ATTORNEYS.

Oct. 6, 1970

T. C. WERGE 3,531,967

ROTARY MACHINE FOR FORMING CIRCUMFERENTIAL
IMPRESSIONS IN CAN BODIES

Filed Aug. 21, 1968

INVENTOR.
THOMAS C. WERGE
BY Lippincott, Gregg,
Hendricson & Stidham
ATTORNEYS.

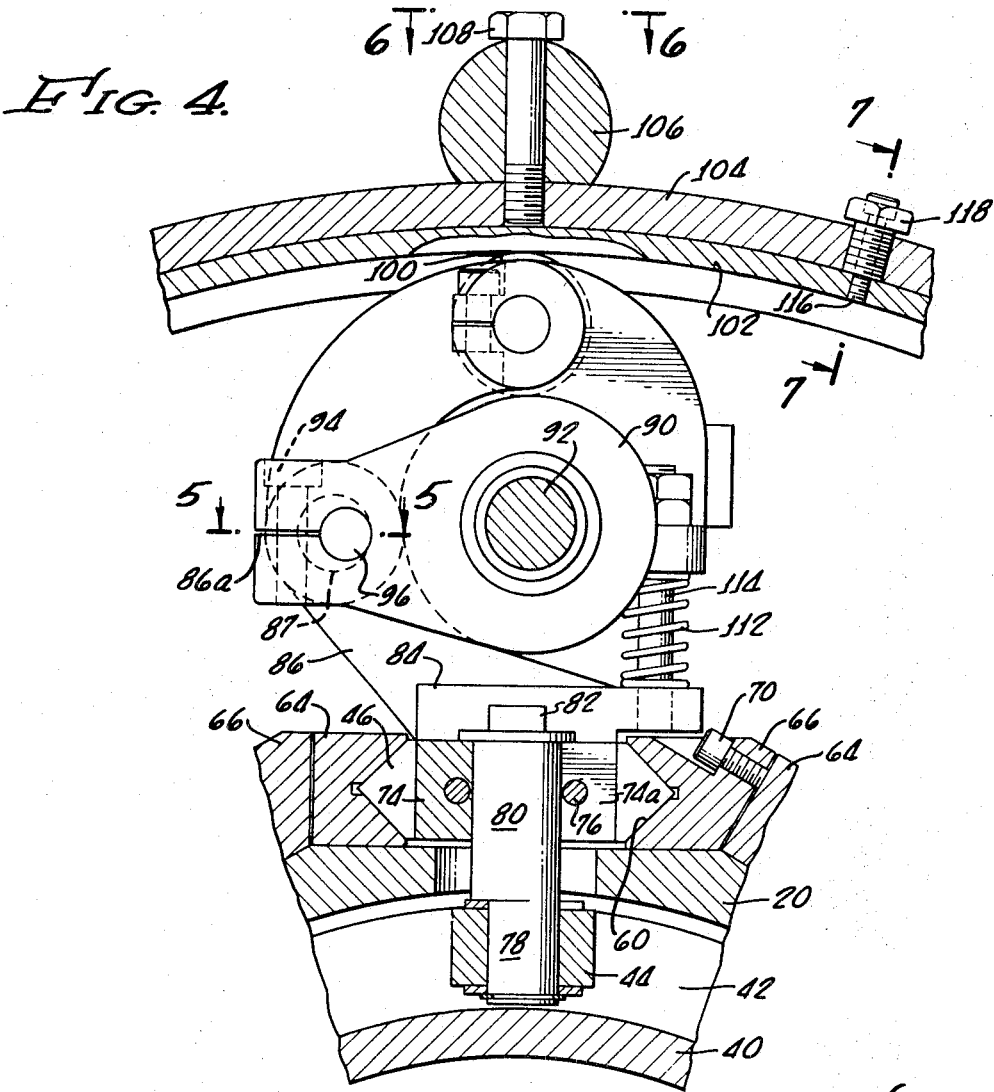

INVENTOR.
THOMAS C. WERGE
BY Lippincott, Gregg,
Hendrickson & Stidham
ATTORNEYS.

United States Patent Office 3,531,967
Patented Oct. 6, 1970

3,531,967
ROTARY MACHINE FOR FORMING CIRCUM-
FERENTIAL IMPRESSIONS IN CAN BODIES
Thomas C. Werge, La Habra, Calif., assignor to Werge
Engineering Corp., a corporation of California
Filed Aug. 21, 1968, Ser. No. 754,504
Int. Cl. B21d 15/04
U.S. Cl. 72—94                                              9 Claims

ABSTRACT OF THE DISCLOSURE

A machine for applying an impression, e.g., a bead, around a can body wherein a rotatable die is carried on an arm pivotally mounted on a slide and moved against a stationary die by a cam which is rigidly supported to prevent radial displacement of the rotatable die under beading force. The slideway includes two rails one of which may be adjusted laterally to desired clearances with the slide, and the cam follower that moves the slide may be removed readily to free the slide for such adjustment. There are also means for adjusting the profile of the overhead cam.

---

This invention relates to a rotary machine for forming circumferential impressions in can bodies and, more specifically, to a can body beading machine.

In order to provide maximum strength in a can body with the thinnest possible gauge metal, is is frequently desirable to bead the can bodies by impressing ribs around the circumference thereof. Can beaders commonly in use comprise a stationary arcuate die element around which a turret is rotated. The turret includes a number of slides carrying rotatable beading rolls which are moved axially to enter into a can body and then are forced against the stationary die to impress the bead around the circumference of the can. Can beading machines ordinarily include pairs of axially opposed dies which enter a can body from opposite sides and have interlocking means to prevent the beading rolls from being distorted or deflected radially under beading pressure. However, in the event that a can body is not properly placed in the machine the can body may be caught between the opposing rolls as they move into engagement. With no space to accommodate the can body considerable damage may be caused to machine components.

It is, therefore, an object of this invention to provide a rotary beading machine wherein the rolls are free of engagement throughout their movement and are moved into engagement with the stationary beading guide by means of an overhead cam which is mounted with sufficient rigidity to prevent radial distortion or deflection of the beading roll.

It is a further object of this invention to provide means for adjusting the width of the slideways for proper clearances with the slide.

It is a further object of this invention to provide for removal of the cam follower from the slide so that it may be moved freely along the slideway to facilitate adjustment of slideway clearances.

It is a further object of this invention to provide adjustable means for selecting a desired profile of the overhead cam.

In carrying out this invention, I provide a turret on which can bodies are received and in association therewith I provide a series of slides which are mounted for reciprocation parallel to the axis of the turret so that beading rolls may be carried into the can body. The beading rolls are pivotally mounted on slides and a cam follower carried on the pivoted member engages an overhead cam to pivot the roll forcing the can body into rolling, firm engagement with the stationary, complementary arcuate die around which the turret rotates. The cam profile may be adjusted to set the pivotal movement of the beading rolls and it is supported on the machine frame with sufficient rigidity that the beading pressure cannot deflect the beading rolls out of parallel relationship with the axis of the turret.

Other objects and advantages of this invention will become apparent from the description following when read in conjunction with the accompanying drawings wherein:

FIG. 4 is a section view showing the slide and beading roll mounting with overhead cam;

FIG. 6 is a fragmentary view taken along line 6—6 of FIG. 4;

FIG. 7 is a section view taken along line 7—7 of FIG. 4; and

Figure 1:
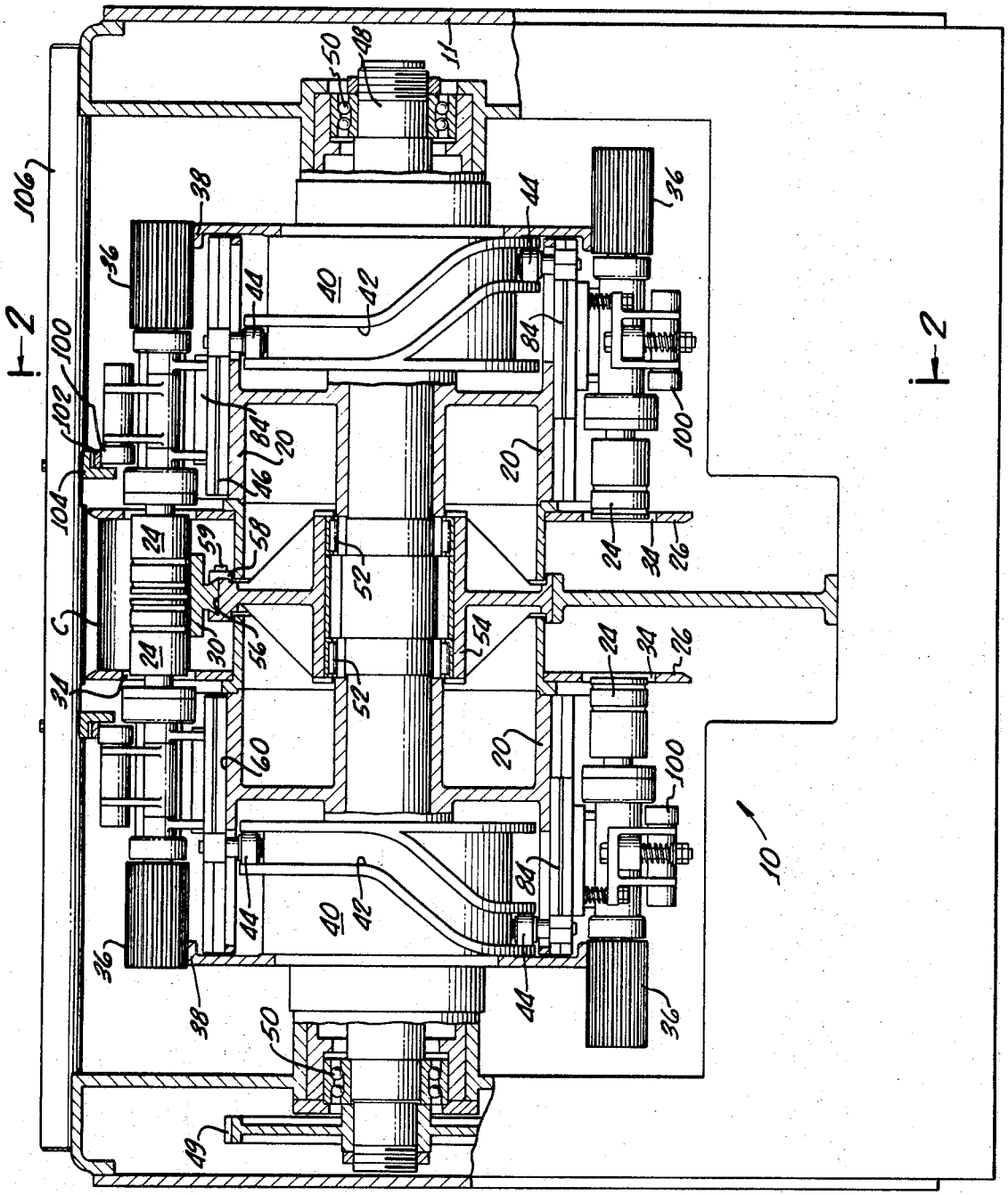
FIG. 1 is a view partially in section of a machine embodying features of this invention; the view being taken generally along line 1—1 of FIG. 2.
Figure 2:
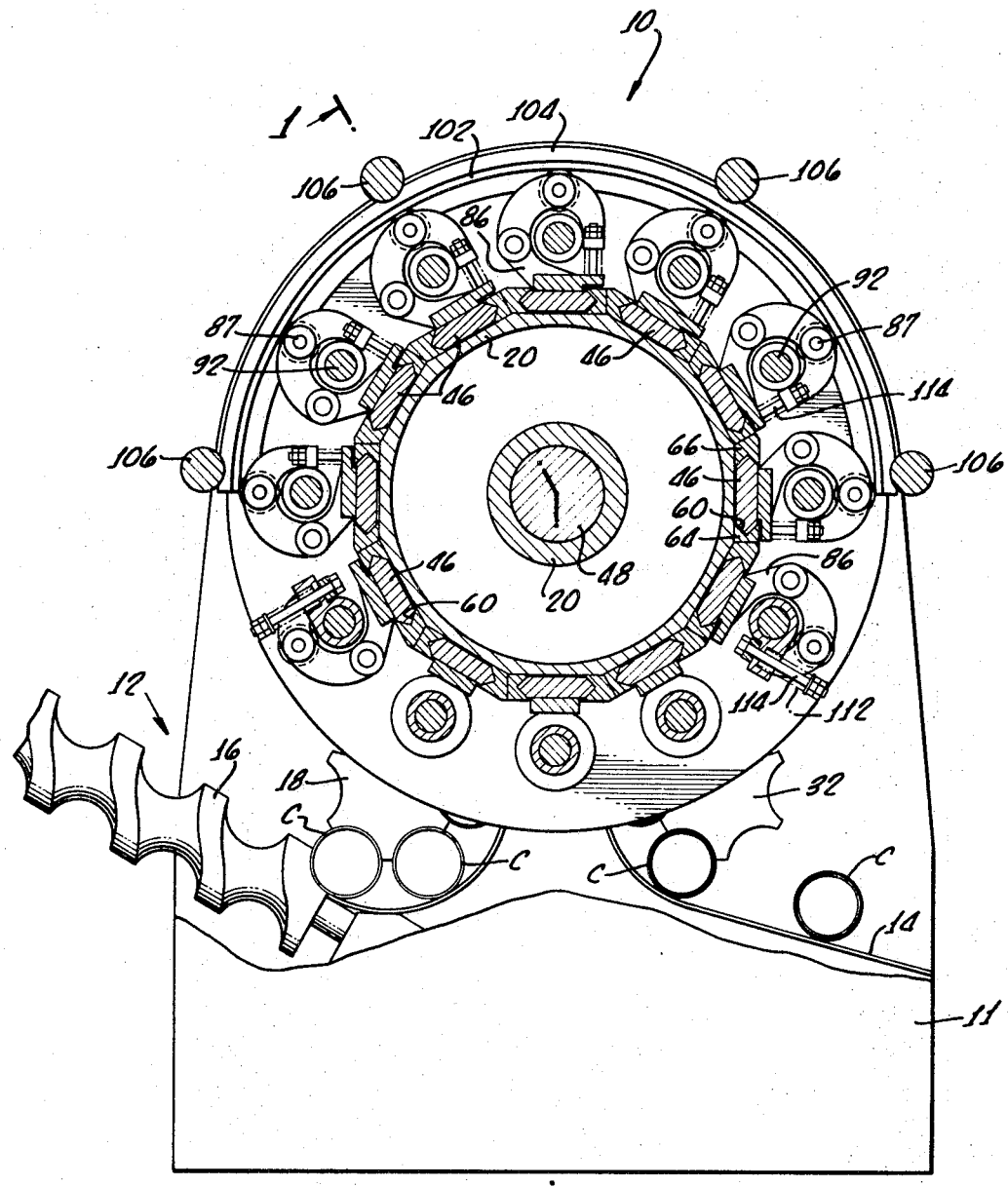
FIG. 2 is a vertical section of the machine as viewed generally along the line 2—2 of FIG. 1.

Referring now to the drawings and more particularly to FIGS. 1 and 2, the can body beading machine is identified generally by the reference numeral 10 and includes a frame 11 on which are carried a can body feed mechanism 12 and an exit chute 14 along which the can bodies C are delivered after operation of the beading machine 10. The feed mechanism 12 includes a feed screw 16 which moves can bodies toward a star wheel 18 which, in turn, transfers the can bodies to the rotatable turret 20. The feed screw 16 and the star wheel 18 are driven by suitable means (not shown) in timed relation to the turret 20 so that each can body C is delivered in proper position to be received on the turret.

As the can bodies complete the circuit with the turret 20 and are carried by the beading rolls 24 (FIG. 1) between the plates 26 around the stationary can beader drum or arcuate die 30 they are delivered to a discharge star wheel 32 which also rotates in timed relation to the turret to receive the beaded can bodies and deliver them to the discharge chute 14.

Now considering the beading function of this machine 10, particularly as shown in FIG. 1, the driven rotating beading rolls 24 which are adapted to move axially through openings 34 in the turret plates 26 and then extend into a can body C from opposite ends thereof. Even when the rolls are fully extended as shown at the top in FIG. 1, there is clearance between the ends of the rolls to provide enough space so that any misaligned can body is simply crushed between the ends of the rolls without causing damage to components of the machine. That is, if something must yield, it is certainly preferably that a can body, and not a machine part, be destroyed. The beading rolls 24 are driven by identical drive mechanisms and, in fact, for certain can bodies, such as those of drawn aluminum or the like, with the bottoms already in place, both beading rolls cannot, of course, enter the can body. In such case, the rolls on one side may be inactivated or, for large production, it may be desirable to build essentially just one-half a machine with beading rolls moving axially from just one side of the turret. In either case, whether there are two sets of beading rolls or a single set, a description of one of the drives apply to one or more.

The beading roll 24 is rotatably driven by a wide pinion 36 which meshes with a stationary ring gear 38 fixed to the frame 11 of the machine 10. Also fixed to the frame is a stationary cylindrical operating cam 40 having a track 42 which is traversed by a roller follower 44 secured to each slide 46 to produce axial movement of the beading rollers 24 as they revolve with the turret on the main drive shaft 48, as will hereinafter be described.

The turret 20 is keyed or otherwise fixed to the drive shaft and bearings 50 and 52 are provided to permit the shaft to rotate freely on the frame 11 and in the stationary beading drum 54. The arcuate stationary complementary beading die 30 is mounted on the drum 54 by means of mating dovetail elements 56 and held in place by a series of complementary clamp members 58 which are secured in place on the drum by any suitable means such as cap screws 59.

Figure 3:
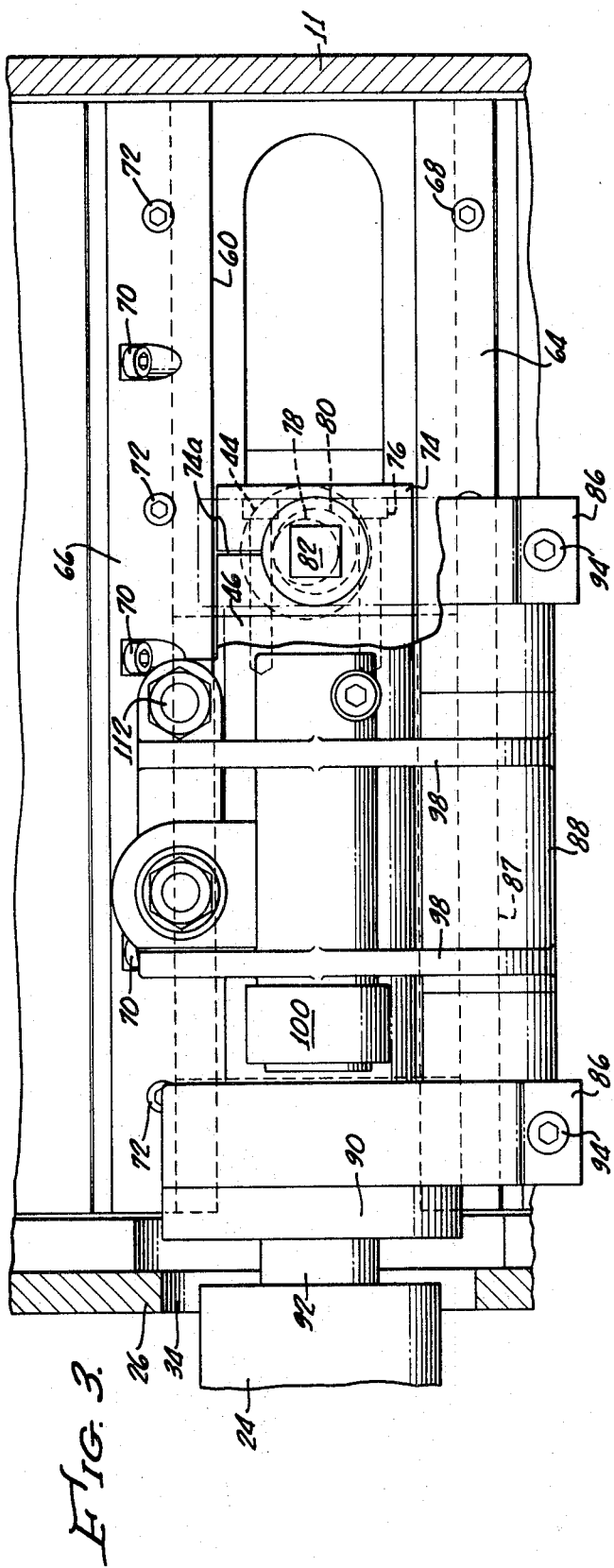
FIG. 3 is an enlarged top view showing portions of the slide and slideway and the beading roll mounting.
Figure 5:
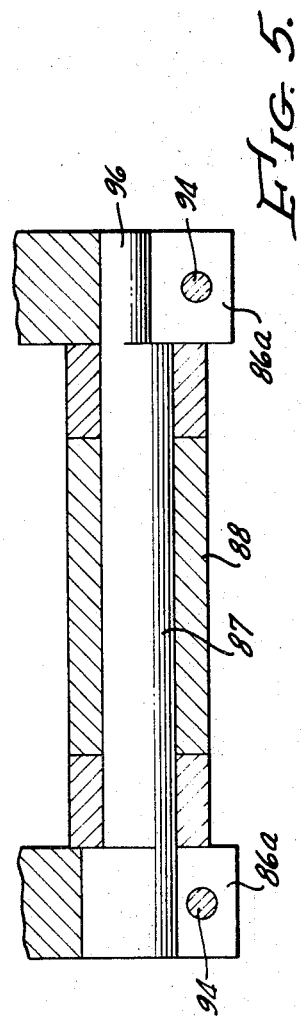
FIG. 5 is a section view taken along line 5—5 of FIG. 4.

Referring now more particularly to FIGS. 2 and 4 a plurality of slideways 60 are provided about the circumference of the turret 20, and each slideway accommodates a slide 46. As shown most clearly in FIGS. 4 and 5 the slideway 60 is made up of two rails 64 and 66, one of which 64 is fixed in position on the turret 20 as by means of cap screws 68, and the other of which 66 may be moved laterally as by engagement of set screws 70 against the back surface 64a (FIG. 4) of an adjacent stationary slideway 64 to adjust the clearance between the slideway 60 and the slide 46 and then locked in place as by means of cap screws 72. This adjustment is facilitated by reason of the fact that the slide cam follower 44 is carried in a separate block 74 which is removably carried on the back of the slide by means of cap screws 76 (FIG. 3). Hence, the cam follower block 74 may be removed from the slide 46 very easily by removing the cap screws 76, with access provided from the side of the machine frame. With the slide so freed it may be moved along the slideway 60 as clearances are adjusted.

Also as shown in FIGS. 3 and 4, the shaft 78 on which the cam follower 44 is rotatably carried has a portion 80 which is eccentric to the axis of the cam follower roller 44 so that by rotating it within the cam block 74 by means of turning the head 82 provision is made for fine adjustment of the axial position of the slide 62. This is accomplished by loosening one of the cap screws 76 so that the block which is split at 74a permits rotation of the eccentric 80. Then, when the adjustment is complete, the cap screw 76 is tightened to lock the cam follower 44 into selected position.

Secured on to each slide 62 by any suitable means (not shown) is a base 84 to which is fixed a first pair of pivot arms 86 between which is carried a pivot shaft 87 on which the beading roll assembly 88 is pivotally mounted. The beading roll assembly includes the bearing housing 90 for the spindle 92 of the rotatable beading die 24. The position of the beading die may be adjusted circumferentially of the turret 20 by loosening a cap screw 94 on the split sleeve 86a forming the pivot shaft mounting and turning the eccentric 96 to vary the position of the pivot shaft 87 (FIG. 5) on which the bead roll assembly 88 is carried. Also carried on the bead roll assembly, as by means of arms 98 integral therewith is a rotatable cam follower 100 which engages an arcuate overhead cam 102 which is securely held in position on the machine frame by securing it to a support ring 104 which in turn is mounted between a plurality of extremely rigid bars 10 or rods 106 which are secured at their ends to the machine frame 11 (FIG. 1). As shown in FIG. 6, provision is made for adjustment of the cam along the supporting rods by engagement of the cap screws 108 in slots 110 in the rods 106, such adjustment being adapted to accommodate changes in can sizes. A spring 112 carried on a bolt 114 extending between a small bracket and the base for adjustment biases the second pair of arms to force the cam follower against the cam as shown progressively in FIG. 2.

Figure 8:
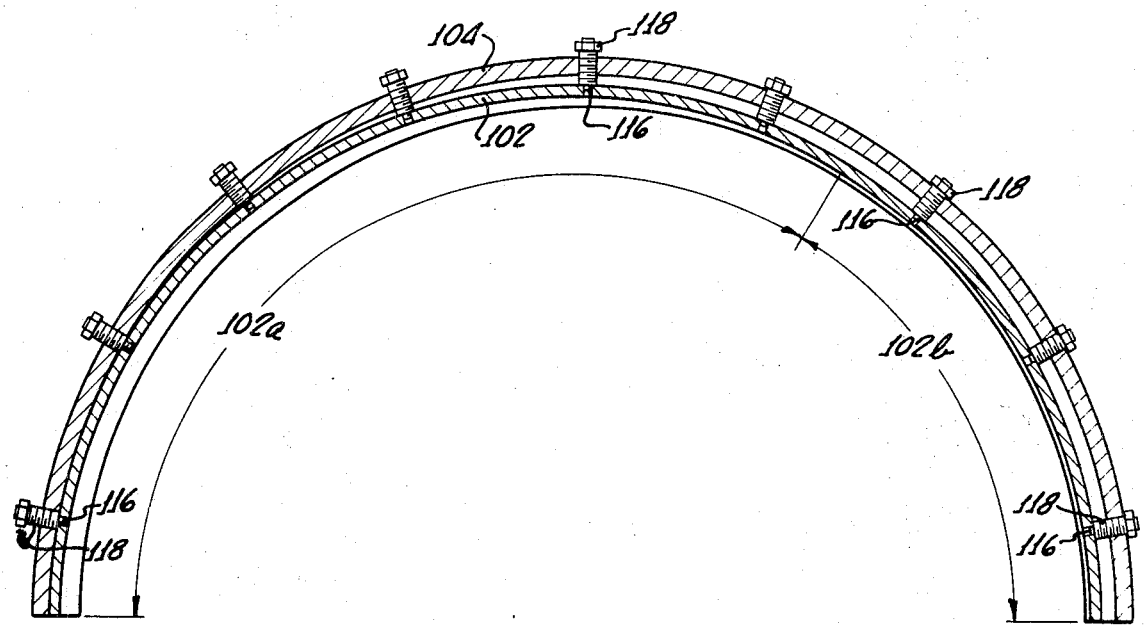
FIGS. 8 and 9 are alternative forms of cams forming a feature of this invention.

Referring now to FIGS. 7 and 8, means are provided for adjusting the profile of the overhead cam. The cam 102 is secured to the cam support ring by means of cap screws 116 which extend through large screws 118. Hence by threading the large screws 118 inward, the radius of the cam 102 may be decreased. As shown in FIG. 8 it is desirable to have a constant radius at the trailing portion of the cam over an arc 102b at least as great as the circumference of a can body so that the bead depth will be uniform around the can. Over the arc 102a the cam may be adjusted to a series of progressively decreasing unifrom radii or it may simply be reduced in radius progressively over its length until it reaches the arc 102b.

Figure 9:
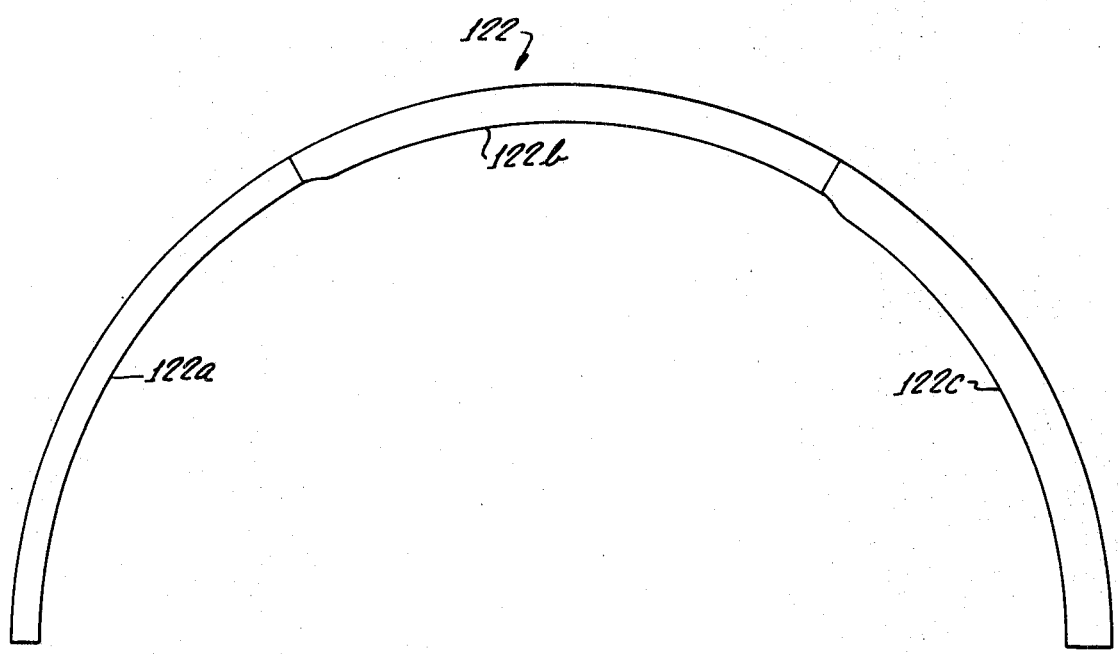

In FIG. 9 I have shown an alternative embodiment wherein the cam 122 has a series of surfaces 122a, 122b and 122c of progressively decreasing radii.

In operation, the main shaft 48 is rotated by a suitable drive train shown partially at 49 to rotate the turret 20 carrying the slides 46 and the gear 38. As the forming rolls 24 are moved from the position shown at the bottom in FIG. 1 the cam followers 44 carried on them follow the track 42 of the cylindrical cam 40 and are moved axially, with the wide pinions 36 sliding along the gear 38 and retaining engagement for continual rotation. Then, after the forming roll is fully extended to the position shown at the top in FIG. 1, the cam follower 100 engages the overhead cam 102 to pivot the bead roll assembly down to press a can body carried thereon into firm engagement with the stationary complementary beading die 30 wherein one or more beads are formed around the circumference of the can.

While this invention has been described in conjunction with preferred embodiments thereof, it is obvious that modifications and changes therein may be made by those skilled in the art without departing from the spirit and scope of this invention as defined by the claims appended hereto.

Having described my invention, I claim:

1. A machine for applying an impression around a can body comprising:
   a frame,
   a turret rotatable on said frame,
   a slideway on said turret disposed parallel to the axis thereof,
   a slide mounted for movement along said slideway,
   a first arm secured on said slide,
   a pivot shaft mounted on said first arm,
   a tool assembly rotatably carried on said pivot shaft,
   a rotatable can body impressing die rotatably mounted on said tool assembly,
   a complementary stationary arcuate can body impressing die mounted on said frame,
   an arcuate overhead stationary cam mounted on said frame radially outward of said stationary die,
   a cam follower carried on said tool assembly to pivot said rotatable die inward and press a can body against said stationary die, and
   yieldable means biasing said tool assembly outward.

2. The machine defined by claim 1 wherein said pivot shaft comprises:
   an eccentric portion rotatably mounted in said arm so that rotation thereof will move said rotatable die circumferentially of said stationary die, and including:
   releasable means securing said eccentric portion in fixed angular position in its mounting.

3. The machine defined by claim 1 wherein said slideway comprises:
   a pair of generally parallel rails,
   adjustment means for moving one of said rails laterally to adjust clearances with said slides, and
   releasable means securing said one rail to said turret in its adjusted position.

4. The machine defined by claim 1 wherein said cam comprises:
   a series of arcuate portions, each portion being generally concentric with said stationary die
   said portions being of progressively smaller radii in the direction of rotation of said turret.

5. The machine defined by claim 1 including:
a cylindrical cam secured on said frame coaxially with said turret,
a cam track formed in said cylindrical cam
a slide cam follower mounted on a pin carried on said slide,
said cam follower extending into said cam track to produce axial movement of said slide as said turret rotates,
an eccentric portion of said slide cam follower pin rotatably mounted in said slide to enable fine adjustment thereof along said slideway, and
releasable means securing said pin in its adjusted position.

6. The machine defined by claim 1 including:
a cylindrical cam secured on said frame coaxially with said turret,
a cam track formed in said cylindrical cam,
a cam follower block reseasably secured to said slide, and
a slide cam follower carried on said block and extending into said cam track to produce axial movement of said slide as said turret rotates,
said block being readily removable from said slide to enable said slide to move freely along said slideway while said turret is stationary.

7. The machine defined by claim 1 wherein:
said rotatable die extends axially from said tool assembly in cantilever fashion unsupported at the end end thereof throughout movement of said slide, and including:
rigid means on said frame supporting said overhead cam against outward radial distortion.

8. The machine defined by claim 1 including:
adjustable means for varying the profile of said overhead cam to progressively selected smaller radii in the direction of turret rotation.

9. The machine defined by claim 2 wherein said slideway comprises:
a pair of generally parallel rails,
adjustment means for moving one of said rails laterally to adjust clearances with said slide,
releasable means securing said one rail to said turret in its adjusted position, and
adjustment means for moving said tools assembly laterally of said slide, and
second releasable means securing said tool assembly in its adjusted position.

References Cited
UNITED STATES PATENTS

| | | | |
|---|---|---|---|
| 996,122 | 6/1911 | Osborn | 72—94 |
| 2,741,292 | 4/1956 | Butters | 72—94 |
| 2,928,454 | 3/1960 | Laxo | 72—94 |

RICHARD J. HERBST, Primary Examiner